US006858165B2

(12) United States Patent
Hirota et al.

(10) Patent No.: US 6,858,165 B2
(45) Date of Patent: Feb. 22, 2005

(54) METHOD OF MANUFACTURING PLASTIC THIN-PLATE ARTICLE WITH PROTRUSIONS ON SURFACE THEREOF

(75) Inventors: Kashichi Hirota, Hachioji (JP); Junji Fukuda, Hachioji (JP)

(73) Assignee: Kyowa Electric and Chemical Co. Ltd., Tokyo (JP)

( * ) Notice: Subject to any disclaimer, the term of this patent is extended or adjusted under 35 U.S.C. 154(b) by 409 days.

(21) Appl. No.: 09/760,162

(22) Filed: Jan. 12, 2001

(65) Prior Publication Data

US 2001/0002735 A1 Jun. 7, 2001

Related U.S. Application Data

(63) Continuation of application No. PCT/JP98/03507, filed on Aug. 6, 1998.

(51) Int. Cl.[7] ............................................. B29D 11/00
(52) U.S. Cl. ..................... 264/2.2; 264/2.5; 264/319; 264/328.1
(58) Field of Search ................................. 264/319, 320, 264/328.1, 328.7, 328.8, 1.1, 2.2, 2.5, 2.7, 1.32

(56) References Cited

FOREIGN PATENT DOCUMENTS

| JP | 59-67008 | 4/1984 |
|----|----------|--------|
| JP | 60-31930 | 2/1985 |
| JP | 01-85010 | 6/1989 |
| JP | 02-98416 | 4/1990 |
| JP | 05-173253 | 7/1993 |
| JP | 06-114860 | 4/1994 |
| JP | 10-249898 | 9/1998 |

Primary Examiner—Mathieu D. Vargot
(74) Attorney, Agent, or Firm—Cohen, Pontani, Lieberman & Pavane

(57) ABSTRACT

A method of manufacturing a diffusion plate for use in a screen plate of projection TV is disclosed. The diffusion plate having a plurality of quadrangular pyramid protrusions almost over one side thereof is manufactured by means of injection molding process of plastic material. This method uses a first molding die having a first molding die surface, a pre-molding die capable of forming a first volume of molding cavity in matching with the first molding die, and a second molding die capable of forming a second volume of molding cavity smaller than the first volume in matching with the first molding die. The molding process comprises; a first step of, with matching the first molding die with the pre-molding die, injecting a molten plastic material from the injection port into the first volume of molding cavity formed between the first molding die and the pre-molding die; and the second step of, after completed the injection in the first step and before curing of the plastic material, releasing the first molding die from the pre-molding die and then matching the first molding die with the second molding die, wherein the plastic material injected in the first step is compressed in the second volume of molding cavity so as to mold the diffusion plate from the plastic material between the first molding die and the second molding die.

7 Claims, 9 Drawing Sheets

(a)

(b)

(a)

(b)

METHOD OF MANUFACTURING PLASTIC THIN-PLATE ARTICLE WITH PROTRUSIONS ON SURFACE THEREOF

This application is a Continuation Application under 35 USC 371 of International Application No. PCT/JP98/03507 filed on 6 Aug. 1998.

TECHNICAL FIELD

The present invention relates to a method of manufacturing a thin-plate article made of a plastic material. More particularly, the present invention relates, but is not limited, to a method suitable for manufacturing a Fresnel lens or a diffusion plate fit to use in a projection TV screen plate.

BACKGROUND ART

A conventional projection TV includes a structure shown in FIG. 1. More specifically, a projected image from an image projection tube 1 is reflected by a mirror 2 and then focused onto a screen plate 3. As shown in FIG. 2(a), the screen plate 3 is comprised of a Fresnel lens 4, a diffusion plate 5 and a protecting plate 6. As shown in FIGS. 2(b) and 2(c), the diffusion plate 5 includes a plurality of angle protrusions 7 which are formed in parallel with each other and which extend in the longitudinal direction of the diffusion plate 5. The protecting plate 6 is formed of a transparent plastic plate.

In addition to a diffusion function, the angle protrusions 7 of the diffusion plate 5 have a lens effect by which the projected image is zoomed in the lateral direction of the diffusion plate 5. The protecting plate 6 is originally provided to protect a diffusion surface of the diffusion plate 5 from scratch or dust. However, since the protecting plate 6 is the transparent plate having a flat surface, surrounding lighting equipment tends to project with the eventual image, resulting in visually unclear image. Thus, a surface of the protecting plate 6 exposed outside is desirable to be a frosted surface having a microscopic irregularity. A surface of the diffusion plate 5 opposite to the diffusion surface thereof may also be formed in a frosted surface to expose outside without providing the protecting plate 6 separately In view of cost and weight, it is desirable to mold the Fresnel lens 4, the diffusion plate 5 and the protecting plate 6, all of which are components of such a screen plate 3, from a plastic material. However, it is not easy to mold a thin-plate article having a microscopic irregular pattern on the surface thereof from a plastic material.

SUMMARY OF THE INVENTION

It is an object of the present invention to provide a method of manufacturing a plastic material thin-plate article with irregularity on a surface thereof, such as a Fresnel lens, a diffusion plate, or the like, for used in a screen plate of a projection TV.

In order to achieve the aforementioned object, according to the present invention, there is provided a method of manufacturing a thin-plate article having protrusions, which are formed almost over at least one surface of the thin-plate article, by molding from a plastic material. In a method according to one aspect of the present invention, the method comprises a step of firstly preparing: a first molding die having a first molding die surface; a pre-molding die which is capable of matching with the first molding die and forming a first volume of molding cavity in matching with the first molding die, and which has an injection port for injecting a plastic material into the molding cavity; and a second molding die which is capable of matching with the first molding die and forming a second volume of molding cavity smaller than the first volume in matching with the first molding die, and which has a second molding die surface facing to the second volume of molding cavity. The molding process comprises; a first step of, with matching the first molding die with the pre-molding die, injecting a molten plastic material from the injection port into the first volume of molding cavity formed between the first molding die and the pre-molding die; and the second step of, after completed the injection in the first step and before curing of the plastic material, releasing the first molding die from the pre-molding die and then matching the first molding die with the second molding die, wherein the plastic material injected in the first step is compressed in the second volume of molding cavity so as to mold a plastic material article between the first molding die and the second molding die.

In a method according to another aspect of the present invention, the method comprises a step of firstly preparing: a first molding die having a first molding die surface; and a second molding die which is capable of matching with the first molding die and forming a molding cavity in matching with the first molding die, and which has a second molding die surface facing to the molding cavity. Then, with releasing the second molding die from the first molding die, supplying a plastic material having flowability onto a plurality of portions on the first molding die surface of the first molding die to spread the plastic material over the first molding die surface by the flowability of the plastic material. Then, matching the second molding die with the first molding die to form the molding cavity, wherein the plastic material filled in the molding cavity in advance is cured with compressed.

In a method according to yet other aspect of the present invention, the method comprises a step of firstly preparing: a first molding die having a first molding die surface; and a second molding die which is capable of matching with the first molding die and forming a molding cavity in matching with the first molding die, and which has a second molding die surface facing to the molding cavity. Then, with releasing the second molding die from the first molding die, linearly supplying a plastic material having flowability via an elongated nozzle onto the first molding die surface of the first molding die, and simultaneously moving the nozzle and the first molding die relatively in the lateral direction each other, to spread the plastic material over the first molding die surface. Then, matching the second molding die with the first molding die to form the molding cavity, wherein the plastic material filled in the molding cavity in advance is cured with compressed.

In a method of still other aspect of the present invention, the method comprises a step of preparing: a plastic material supply station; a first molding station provided adjacently to the plastic material supply station; a second molding station provided adjacently to the plastic material supply station in a different position from that of the first molding station; a first molding die provided respectively in association with each of the first molding station and the second molding station, the first molding die being movable between the associated molding station and the plastic supply station, the first molding die having a first molding die surface; a second molding die provided at each of the first molding station and the second molding station, the second molding die being capable of matching with the first molding die and forming a molding cavity in matching with the first molding die, the second molding die having a second molding die surface facing to the molding cavity; and an elongated nozzle provided at the plastic material supply station. Then, firstly moving the first molding die associated with the first molding station to the plastic material supply station; linearly supplying a plastic material having flowability via an elongated nozzle onto the first molding die surface of the first molding die, and simultaneously moving the nozzle and the first molding die relatively in the lateral direction each other, to spread the plastic material over the first molding die surface. Then, moving the first molding die associated with the first molding station to the first molding station; matching the second molding die provided at the first molding station with the first molding die which has been moved to the first molding station to form the molding cavity, wherein the plastic material filled in the molding cavity in advance is cured with compressed. In this method, during the latter step(s), moving the first molding die associated with the second molding station to the plastic material supply station, and performing the same steps mentioned above to spread the plastic material over the first molding surface of the first molding die associated with the second molding station.

BRIEF DESCRIPTION OF THE DRAWINGS

FIG. 2 shows a screen plate of the conventional projection TV, wherein FIG. 2(a) is a longitudinal-sectional view showing an overall construction of the screen plate, FIG. 2(b) is a partial top plan view thereof, and FIG. 2(c) is a cross-sectional view thereof;

FIG. 3 shows one example of a diffusion plate for use in a screen plate according to the present invention, wherein FIG. 3(a) is a partially enlarged top plan view of the diffusion plate and FIG. 3(b) is a partially perspective view thereof;

FIG. 4 shows another embodiment of a diffusion plate for use in the screen plate according to the present invention, wherein FIG. 4(a) is a partially enlarged top plan view of the diffusion plate and (b) is a partially perspective view thereof;

FIG. 6 shows manufacturing steps of the diffusion plate for use in the screen plate according to the present invention, wherein FIG. 6(a) shows a first step and FIG. 6(b) shows a second step;

FIG. 7 shows other embodiment of the method according to the present invention, wherein FIG. 7(a) is a top plan view of the device for use in the method and FIG. 7(b) is a partially sectional side view thereof;

FIG. 9 shows yet other embodiment according to the present invention, wherein FIG. 9(a) is a top plan view of a device for use in the method and FIG. 9(b) is a partially sectional side view thereof.

BEST MODE FOR CARRYING OUT THE INVENTION

Figure 1:
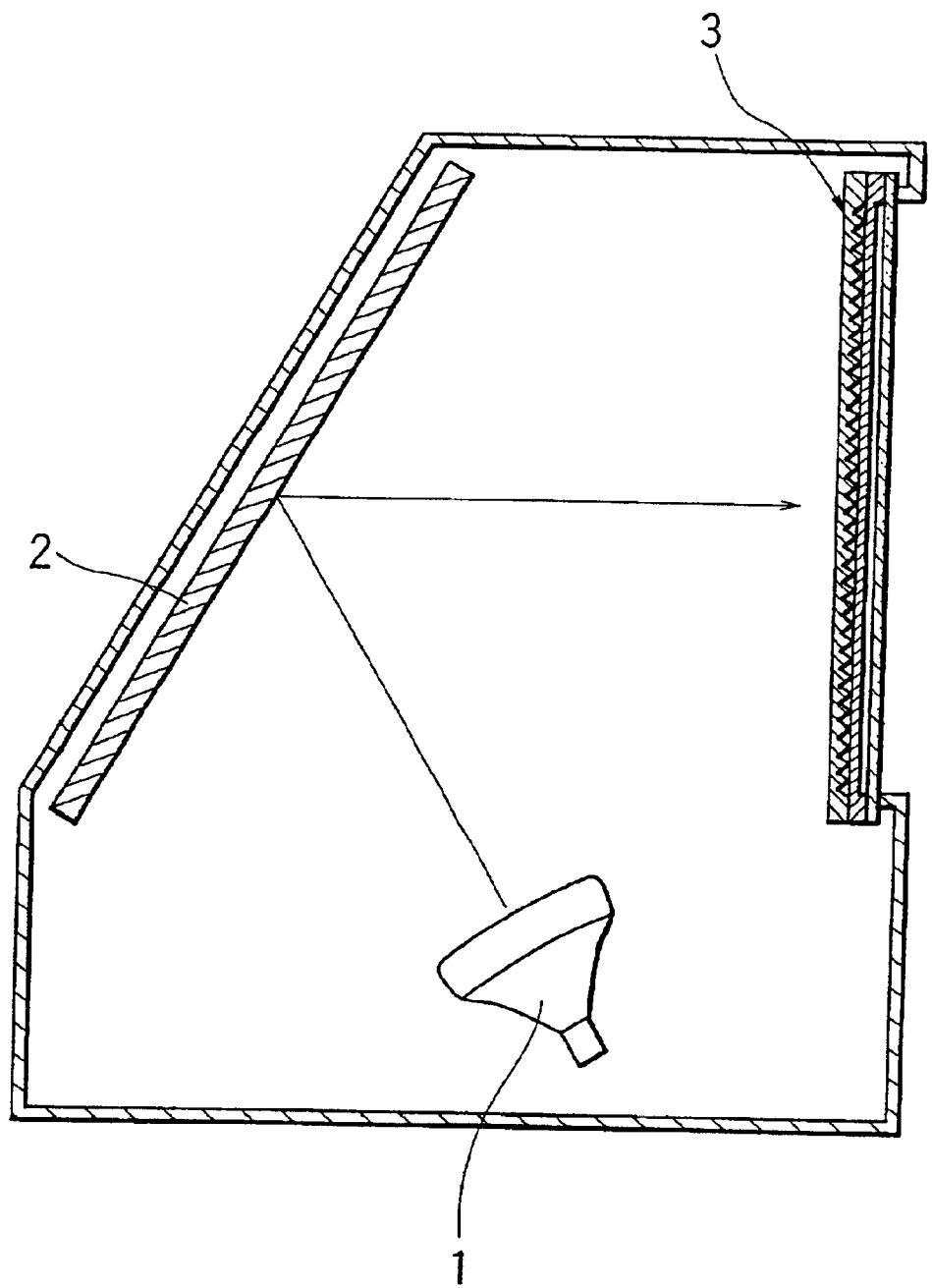
FIG. 1 is a longitudinal-sectional view showing a schematic construction of a typical conventional projection TV.
Figure 2:
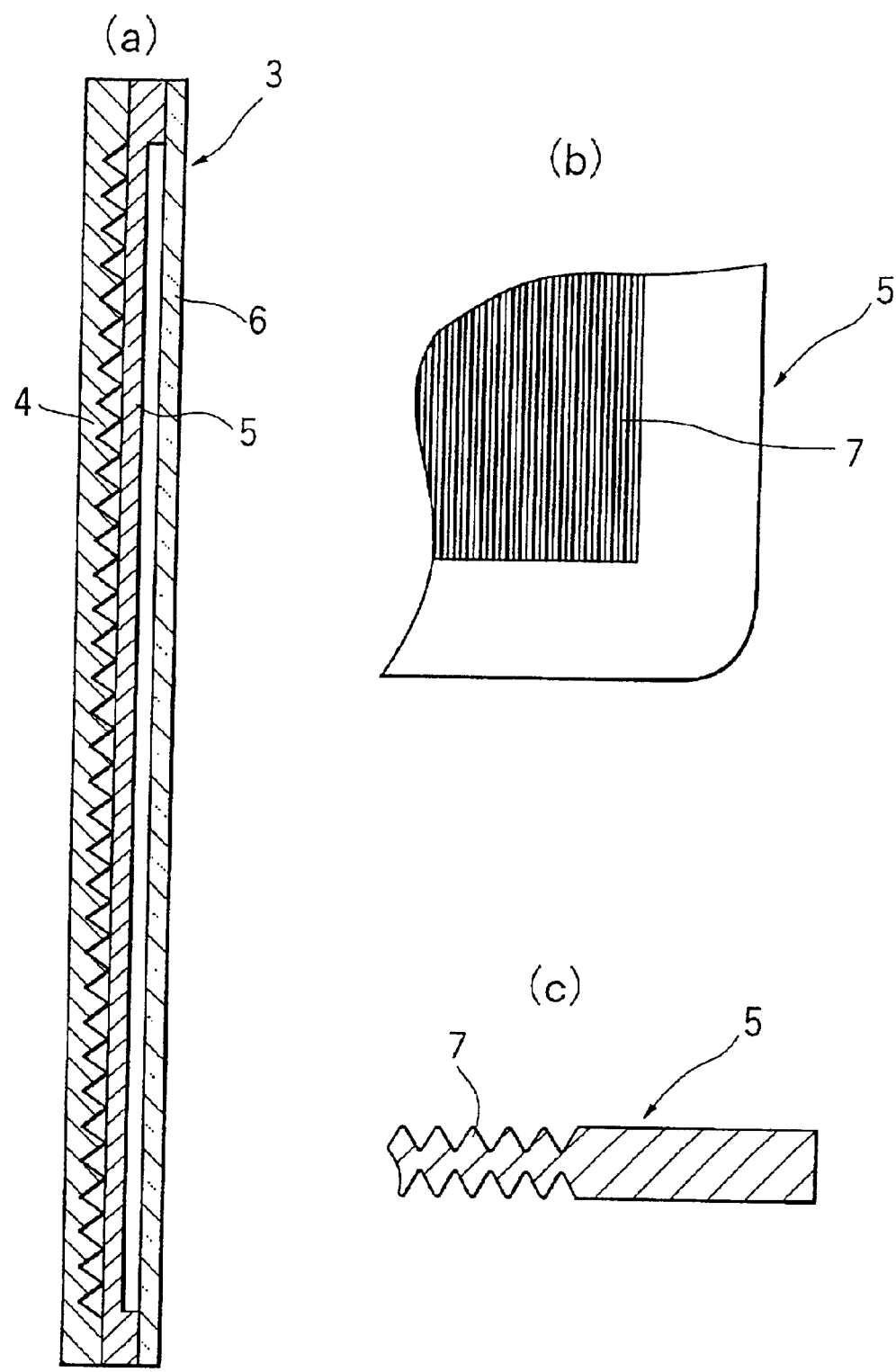
Figure 3:
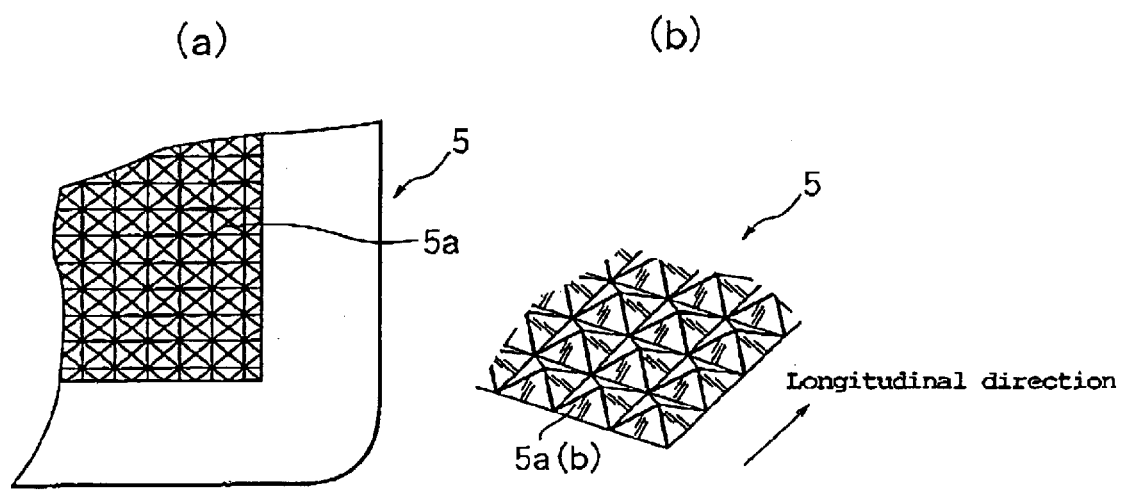
Figure 4:
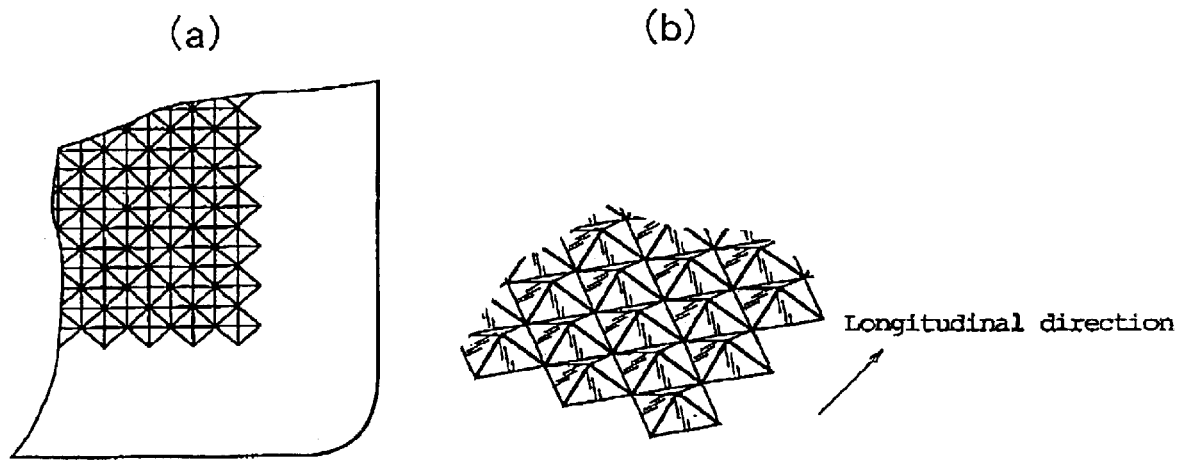

The embodiments of the present invention will now be described with reference to the drawings. FIG. 3(a) and FIG. 3(b) show one example of a diffusion plate manufactured by a method of the present invention. As shown in the drawings, the diffusion plate 5 includes protrusions 5a, each of which is formed in quadrangular pyramid and which are arranged in the longitudinal and lateral directions alongside each other almost over a surface of the diffusion plate 5. The quadrangular pyramid protrusions 5b may be arranged at a slant or in the diagonal direction as shown in FIG. 4(a) and FIG. 4(b). In such diffusion plates 5, it is preferable to make an opposite surface to the surface having the protrusions 5a or 5b into a frosted surface.

Figure 5:
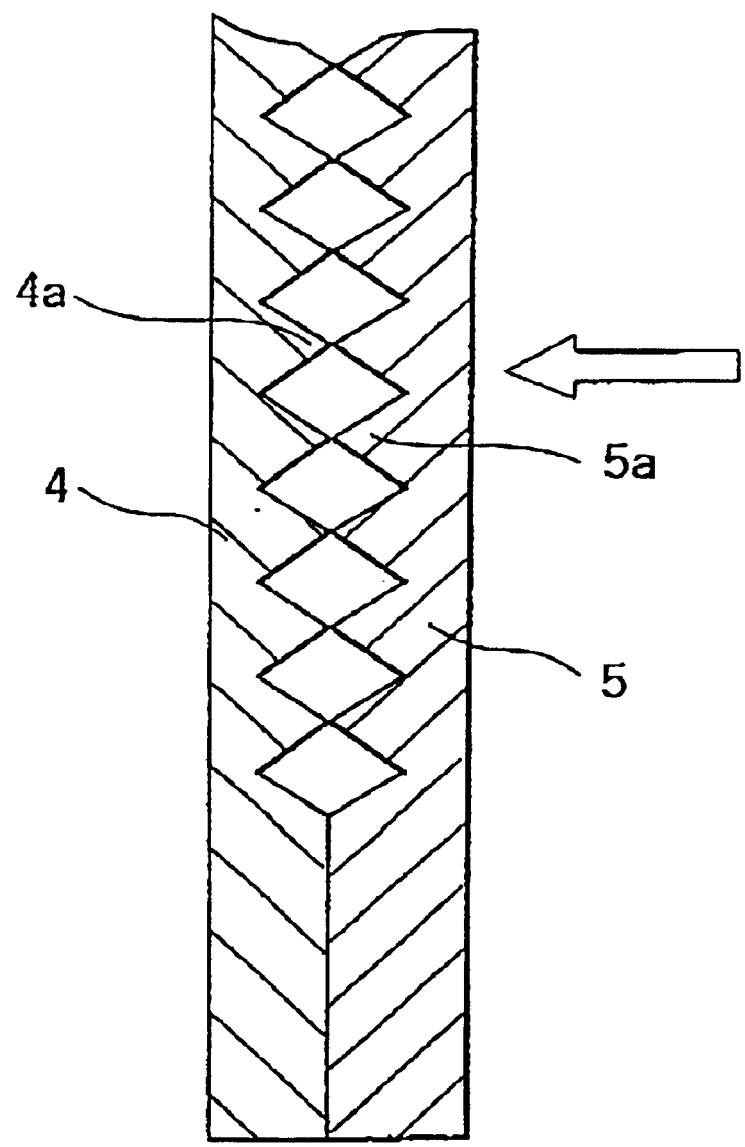
FIG. 5 is a longitudinal-sectional view of an embodiment of the screen plate according to the present invention.

FIG. 5 shows one example of a screen plate using the diffusion plate manufactured by a method according to the present invention. The diffusion plate 5 is positioned to make the surface having the protrusions 5a face a lens surface of a Fresnel lens 4 and is fixed to the Fresnel lens 4 by means of bonding or the like. The diffusion plate 5 having the protrusions 5b can be positioned and fixed in the same manner. The arrow in FIG. 5 shows the direction of visual observation.

Figure 6:
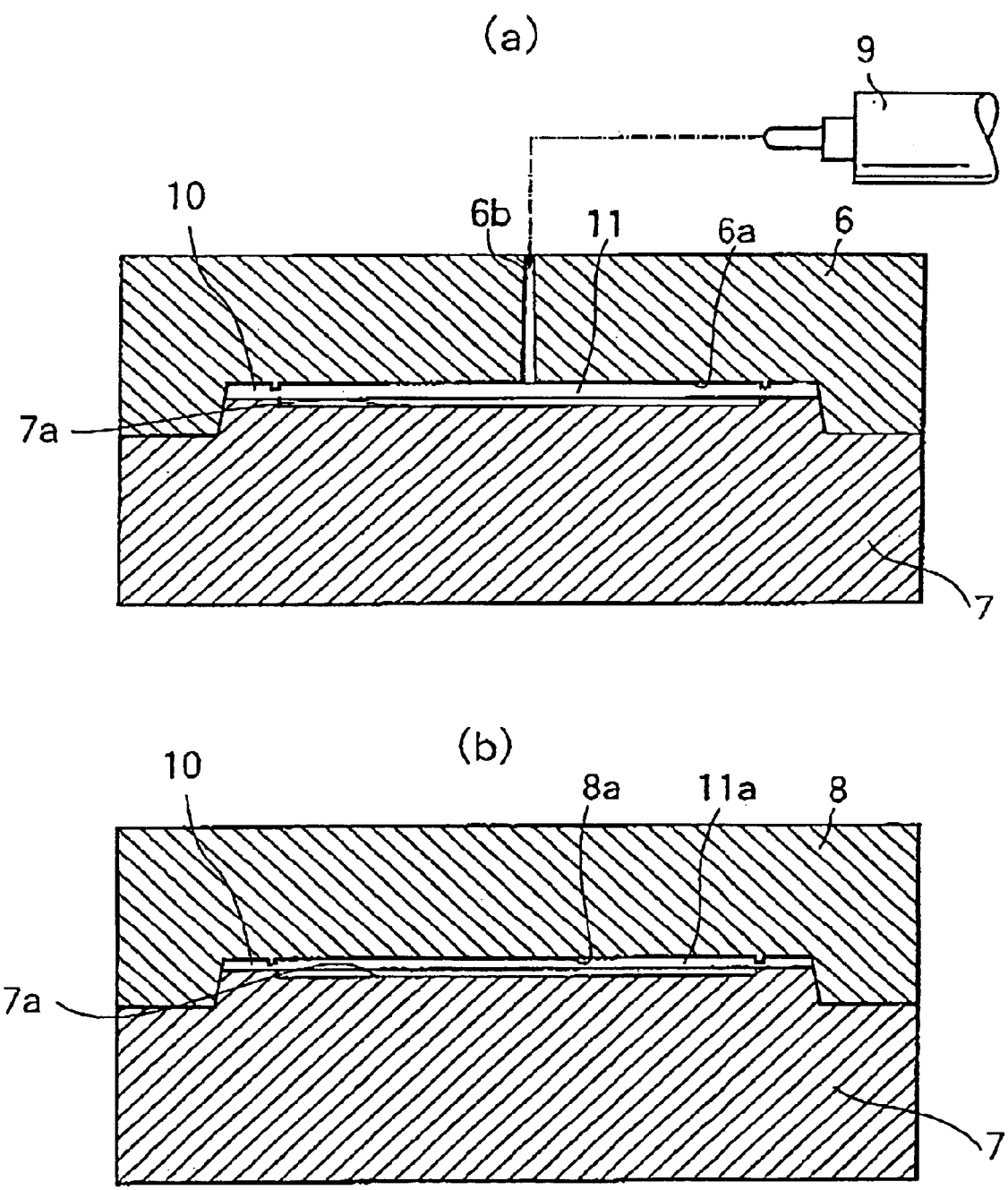

FIG. 6 shows a method according to a first aspect of the present invention for manufacturing the aforementioned diffusion plate 5 for use in the screen plate by molding from a plastic material. Dies for use in manufacturing the diffusion plate 5 comprises an upper die having a pre-molding recessed portion 6a, i.e. a pre-molding die 6, a lower die 7 having a molding recessed portion 7a formed with a molding surface, and an upper die 8 having a molding recessed portion 8a formed with a molding surface. A gate 6b for injecting a molten plastic material therethrough is formed in the center of the pre-molding die 6. A plastic material injection cylinder 9 is provided at a gate 6b. The recessed portion 6a of the pre-molding upper die 6 and the raised portion 7a of the lower die 7 are adapted to form an excess area 10 outside of the molding area for the diffusion plate. With matching the pre-molding upper die 6 with the lower die 7, a first volume of pre-molding cavity 11 is formed therebetween.

The molding upper die 8 and the lower die 7 can be moved from the position shown in FIG. 6(b) downward and upward respectively to match closer with each other. Thus, with matching the molding upper die 8 with the lower die 7, a smaller volume of molding cavity 11a than that of the first volume is formed therebetween.

In manufacturing, as shown in FIG. 6(a), the pre-molding upper die 6 and the lower die 7 are matched with each other and retained to form the pre-molding cavity 11. Then, a molten or softened plastic material is injected from the plastic injection cylinder 9 held at the gate 6b. The plastic material may include methylmethacrylate, polycarbonate, polystyrene or the like.

When a predetermined amount of the molten or softened plastic material is injected into the pre-molding cavity 11, the injection is stopped. Then, the lower die 7 is released from the pre-molding upper die 6 and moved under the molding upper die 8 as the state shown in FIG. 6(b), with retaining the injected plastic material within the recessed portion 7a. Then, the lower die 7 is moved upward and matched with the upper die 8 to form the molding cavity 11a. By virtue of this operation, the injected plastic material is compressed within the smaller volume of molding cavity 11a than that of the pre-molding cavity 11 shown in FIG. 6(a), and molded by the molding surfaces of the recessed portions 7a and 8a. In this step, an excess plastic material in the molding cavity 11a is extruded into the surrounding excess area 10. Thus, according to this method, the surface having the quadrangular pyramid protrusions 5a and 5b and the opposite frosted surface of the diffusion plate surface can be simultaneously molded.

FIG. 7(a) and FIG. 7(b) show another embodiment of the present invention. In this embodiment, a lower die 7 has the same structure as that of the previous embodiment. While not shown in the drawings, the same structure as the upper die 8 in the previous embodiment is applied as an upper die of this embodiment. In this embodiment, a nozzle device 12 is provided to supply a plastic material to the lower die 7. The nozzle device 12 has a nozzle block 13 in which an X-shaped injection manifold 14 is provided extending along two crossing diagonal lines 13a and 13b. An injection nozzle 15 is placed at each end of the X-shaped injection manifold 14. The injection nozzle 15 is composed of a known structure opened/closed by a cutoff pin 16 in which the plastic material from the injection manifold 14 is discharged from the nozzle 15 when the cutoff pin 16 is pulled in to open the nozzle opening. An injection passage 18 extending from a plastic material injection cylinder 17 is connected to a crossed portion of the X-shaped injection manifold 14.

In manufacturing a plastic material thin-plate article, firstly, with releasing the lower die 7 from the upper die (not shown), the lower die 7 is located under the nozzle device 12. Then, the injection cylinder 17 is activated to supply the molten and fluidic plastic material from the injection nozzle 15 onto the molding recessed portion 7a of the lower die 7. The plastic material supplied onto the molding recessed portion 7a of the lower die 7 is spread over the molding surface of the molding recessed portion 7a of the lower die 7 due to flowability of the plastic material. Then, the cutoff pin 16 is moved in its closing position to close the nozzle 15, and the nozzle device 12 is separated from the lower die 7. The lower die 7 is then moved under the upper die, and the same steps as those of the previous embodiment are performed to mold between the lower die 7 and the upper die.

Figure 7:
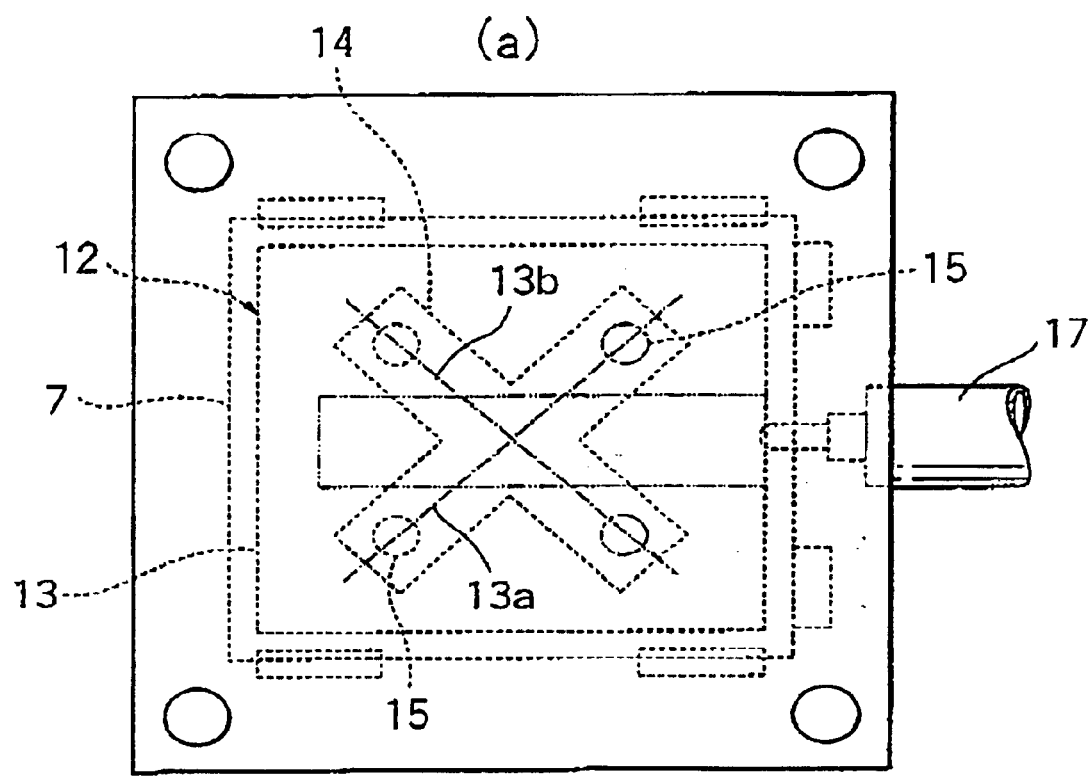
Figure 7:
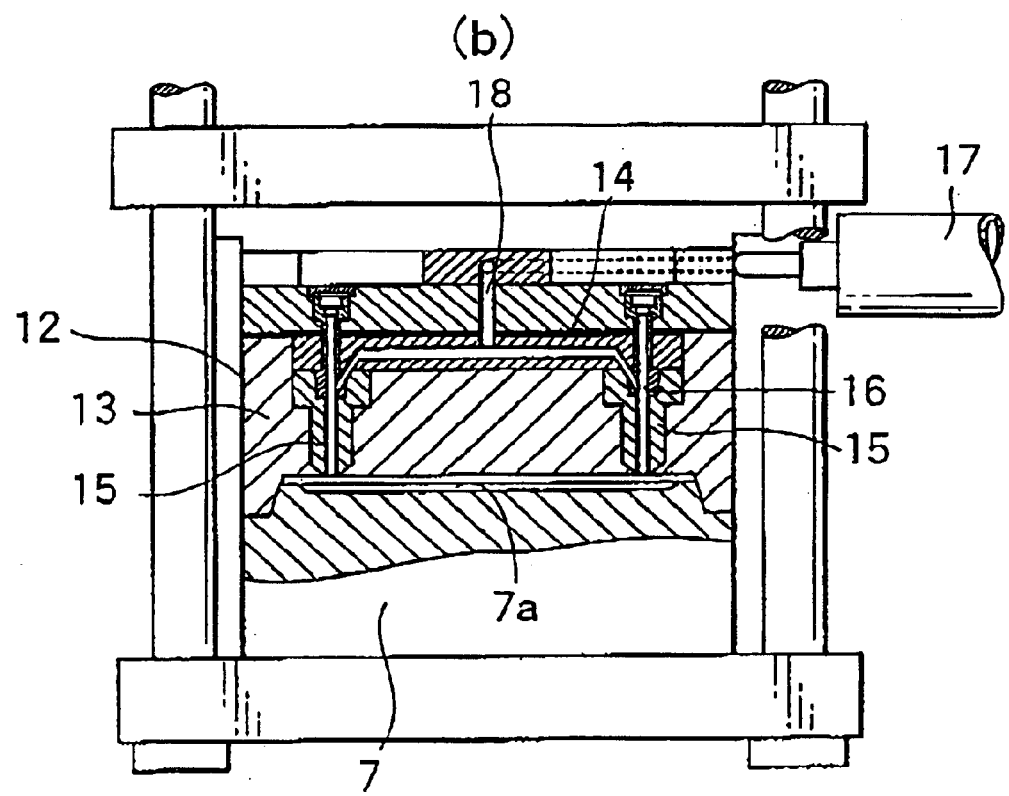
Figure 8:
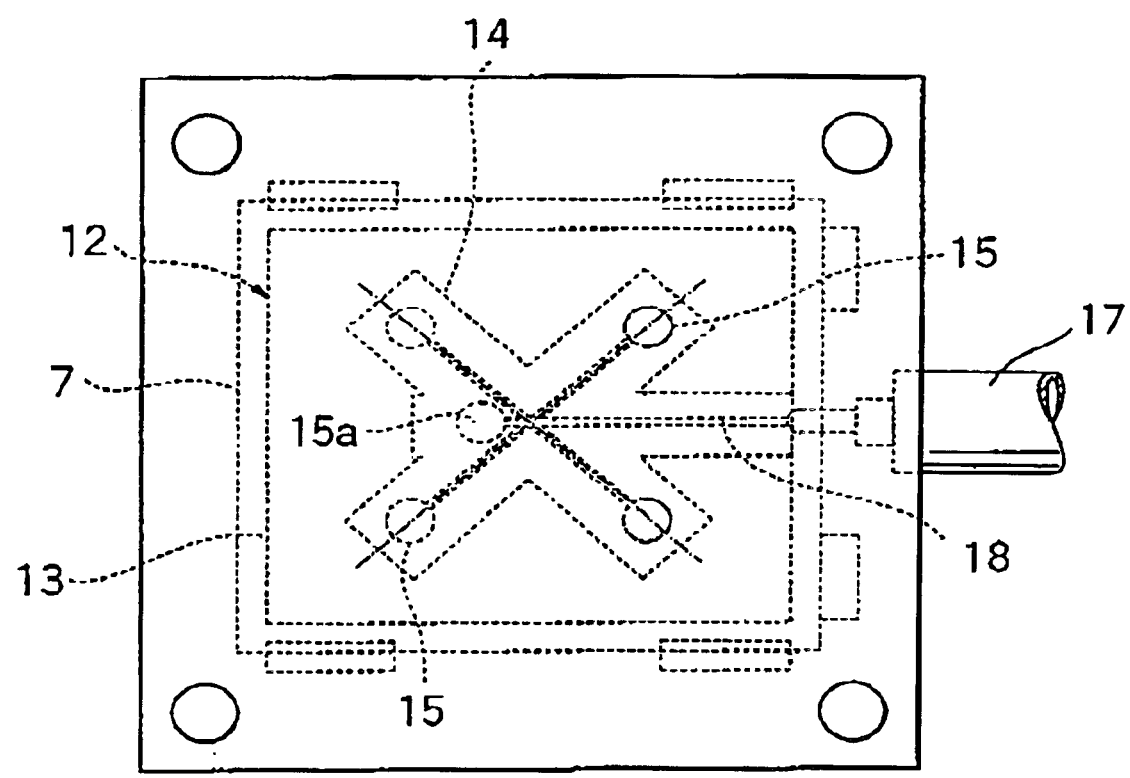
FIG. 8 is a top plan view showing an example of a device for use in an alternative method of the embodiment in FIG. 7.

FIG. 8 shows an alternative example of the embodiment shown in FIG. 7. In this embodiment, in addition to four nozzles 15, the X-shaped injection manifold 14 provided at the nozzle block 13 of the nozzle device 12 is provided with a further nozzle 15a adjacently to a central portion of the X-shape, i.e. the crossed portion of the two diagonal lines. Other construction is same as in the embodiment shown in FIG. 7.

FIG. 9(a) and FIG. 9(b) show yet other embodiment according to the present invention. In this embodiment, a nozzle device 21 is applied as substitute for the nozzle device 12 of the embodiment shown in FIG. 7. A molding lower die 7 and a molding upper die (not shown) are in the same structure as those of respective the previous embodiments. The nozzle device 21 includes a nozzle 22 having an elongated slit type of discharge opening 22a, and an plastic material extruding cylinder or a plastic material extruding screw 23 is connected to the nozzle 22. The nozzle device 21 and the lower die 7 can be moved relatively to each other. In this embodiment, the lower die 7 is moved laterally with respect to the nozzle device 21 as shown by the broken line in FIG. 9(b).

As shown in FIG. 9(a), the nozzle 22 is positioned to allow the slit type discharge opening 22a to extend in the width direction of the molding recessed portion 7a of the molding lower die 7. A gear pump 24 is positioned above the nozzle 22 in communicate with a plastic material passage within the nozzle 22. In operation, the extruding cylinder or extruding screw 23 is activated to supply the molten plastic material to the nozzle 22. The plastic material is then supplied from the discharge opening 22a of the nozzle 22 onto the molding recessed portion 7a of the lower die 7. During this operation, the lower die 7 is moved relatively to the nozzle device 21 as shown by the broken line in FIG. 9(b). Thus, the plastic material is linearly supplied and spread in the width direction of the molding recessed portion 7a of the lower die 7 due to flowability of the plastic material. When the lower die 7 is moved relatively to the nozzle device 21, the plastic material is supplied and spread almost over the entire area in the longitudinal direction of the molding recessed portion 7a of the lower die. Then, the extruding cylinder or extruding screw 23 is then deactivated, and the gear pump 24 is activated to suck back a residual molten plastic material in the nozzle 22. This enables to prevent the plastic material from dropping down from the discharge opening 22a of the nozzle 22. Then, the lower die 7 is moved under the upper die (not shown) and the same steps as those of the previous embodiments are performed to mold.

Figure 9:
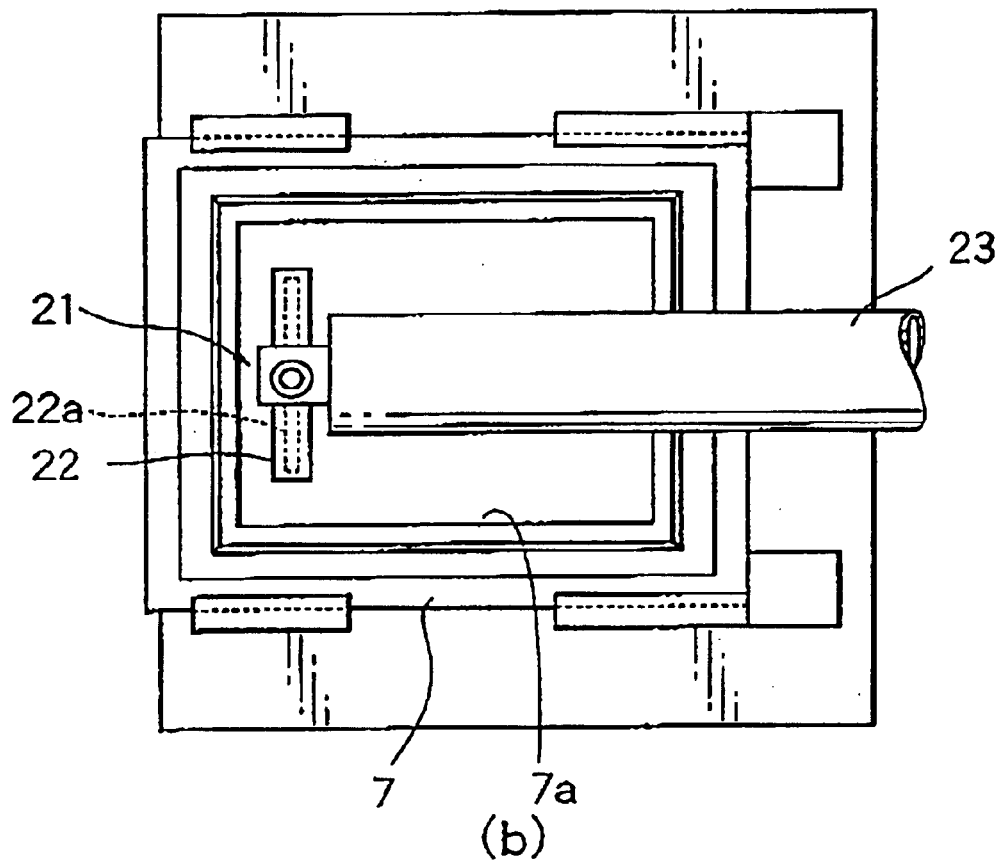
Figure 9:
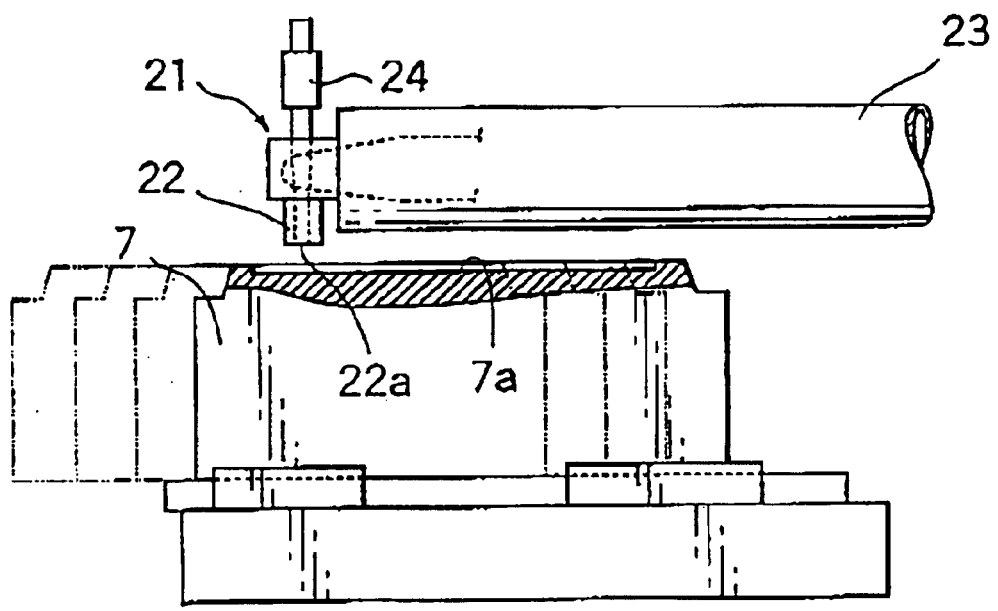
Figure 10:
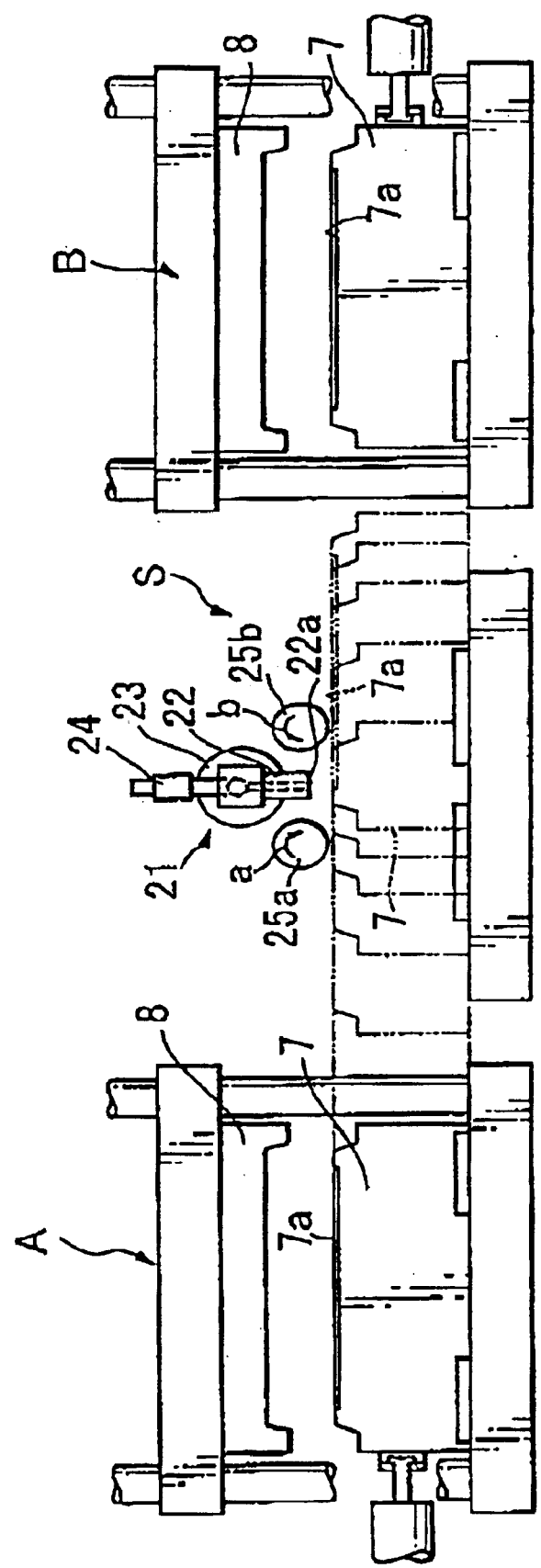
FIG. 10 is a side view of a molding device showing still other embodiment according to the present invention.

FIG. 10 shows one application of the embodiment of FIG. 9. The device for use in this method includes a nozzle device 21 similar to that shown in FIG. 9, in a plastic material supply station S. A first molding station A is provided adjacently to one side of the plastic material supply station S, while a second molding station B is provided adjacently to another side of the plastic material supply station S. Each of the first and second molding stations A and B is provided with an upper die 8 which is vertically movable. Each of the molding stations A and B also has a lower die 7 which is movable between each of the molding stations and the plastic material supply station S. With respect to the nozzle device 21 of the plastic material supply station S, a leveling roller 25a rotating in the direction of the arrow "a" of FIG. 10 is positioned on the side of the first molding station A, while a leveling roller 25b in the direction of the arrow "b" is positioned on the side of the second molding station B.

In the method of the present invention applying the device shown in FIG. 10, the lower die 7 associated with the first molding station A is firstly moved under the nozzle device 21 of the plastic material supply station S. Then, the molten plastic material is linearly supplied to the molding surface 7a of the lower die 7 in the same steps as described for FIG. 9. During these steps, the lower die 7 is moved to the direction of the first molding station A as shown by the arrow "c" in FIG. 10 and the plastic material is then supplied onto the almost entire surface of the molding surface 7a of the lower die 7. The molten plastic material supplied onto the molding surface 7a of the lower die 7 is leveled by the leveling roller 25b rotating in the direction of the arrow "a". When the supply of the plastic material is completed, the extruding cylinder or the extruding screw 23 is stopped, the molten plastic material in the nozzle 22 is sucked back by the gear pump 24.

Then, the lower die 7 is moved back to the first molding station A and the upper die 8 of the first molding station A is moved downward to a position in which the upper die 8 is matched with the lower die 7. Then, in the molding cavity formed between the upper die and the molding surface 7a of the lower die 7, the plastic material is molded. During these steps, the lower die 7 of the second molding station B is moved to the plastic material supply station S and the molten plastic material is supplied onto the molding surface 7a of the lower die 7 in the same operation described above. This method is effective to enhance the manufacturing efficiency.

According to the method of the present invention, a thin-plate plastic material article having a microscopic irregular pattern on the surface thereof can be easily manufactured. When the diffusion plate shown in FIG. 3 is applied, there is no need to provide a protecting plate outside of the screen plate, resulting in simplified structure. Providing a frosted surface on the opposite surface to the surface having protrusions of the diffusion plate enables to solve the problem that the image becomes visually unclear due to reflected surrounding light. The method of the present invention has a significant effect on forming the Fresnel lens and the diffusion plate having irregularity on large and flat surface thereof without any problems.

While the present invention has been described in connection with specific embodiments with reference to the drawings, the present invention is not limited to the illustrated specific embodiments and various modifications and variations may be made within the scope of the spirit of the present invention according to the claims. Thus, the present invention is limited not by the illustrated specific structure but only by the appended claims.

What is claimed is:

1. A method of manufacturing a thin-plate article having at least one surface, with at least a part of the at least one surface of the thin-plate article being formed into a particular shape, by molding from a plastic material, said method comprising steps of:

preparing a first molding die having a first molding die surface;

preparing a pre-molding die which is capable of matching with said first molding die and forming a first volume of molding cavity in matching with said first molding die, and which has an injection port for injecting a plastic material into said molding cavity; and preparing a second molding die which is capable of matching with said first molding die and forming a second volume of molding cavity smaller than said first volume in matching with said first molding die, and which has a second molding die surface facing to said second volume of molding cavity;

with matching said first molding die with said pre-molding die, injecting a molten plastic material from said injection port into said first volume of molding cavity formed between said first molding die and said pre-molding die; and after completion of said injecting step and before curing of said plastic material, releasing said first molding die from said pre-molding die and then matching said first molding die with said second molding die, wherein said plastic material injected in said injecting step is compressed in said second volume of molding cavity so as to mold the plastic material article between said first molding die and said second molding die.

2. A method of manufacturing a thin-plate article having a at least one surface, with at least a part of the at least one surface of the thin-plate article being formed into a particular shape, by molding from a plastic material, said method comprising steps of:

preparing a first molding die having a first molding die surface; and preparing a second molding die which is capable of matching with said first molding die and forming a molding cavity in matching with said first molding die, and which has a second molding die surface facing to said molding cavity;

with releasing said second molding die from said first molding die, supplying a plastic material having flowability onto a plurality of portions on said first molding die surface of said first molding die to spread said plastic material over said first molding die surface by the flowability of said plastic material, said plastic material being supplied at two portions on each of two crossing diagonal lines whereby the plastic material is supplied at four portions; and matching said second molding die with said first molding die to form said molding cavity, wherein said plastic material filled in said molding cavity in advance is cured under compression.

3. A method as defined in claim 2, wherein said plastic material is further supplied to a portion adjacent to a crossed point of said two diagonal lines.

4. A method as defined in claim 1, wherein said thin-plate article is a diffusion plate having quadrangular pyramid protrusions.

5. A method as defined in claim 1, wherein said thin-plate article is a Fresnel lens.

6. A method as defined in claim 2, wherein said thin-plate article is a diffusion plate having quadrangular pyramid protrusions.

7. A method as defined in claim 2, wherein said thin-plate article is a Fresnel lens.

* * * * *